Oct. 23, 1956   E. A. CRAVEN   2,767,473
DETACHABLE SCOPE MOUNT FOR GUNS
Filed Sept. 13, 1954   2 Sheets-Sheet 1

EDGAR A. CRAVEN
INVENTOR
HUEBNER, BEEHLER,
WORREL & HERZIG
ATTORNEYS
BY Richard M. Worrel Oct. 23, 1956  E. A. CRAVEN  2,767,473
DETACHABLE SCOPE MOUNT FOR GUNS
Filed Sept. 13, 1954  2 Sheets-Sheet 2

EDGAR A. CRAVEN
INVENTOR
HUEBNER, BEEHLER,
WORREL & HERZIG
ATTORNEYS
BY Richard M. Worrel

United States Patent Office 2,767,473
Patented Oct. 23, 1956

2,767,473

DETACHABLE SCOPE MOUNT FOR GUNS

Edgar A. Craven, Selma, Calif.

Application September 13, 1954, Serial No. 455,661

11 Claims. (Cl. 33—50)

The present invention relates to accessories for guns and more particularly to a detachable scope mount for guns.

The use of telescopic sights for rifles has long been desirable due to the greatly increased accuracy at substantial firing distances. A telescope or a scope, as it is known to riflemen, is attached to a rifle by a device called a mount. The mount is generally given as much consideration as the scope itself inasmuch as the scope can be of no greater accuracy than the mount permits.

Several mounts are known and are presently in use but all offer one or more disadvantages which the present invention seeks to overcome. One form of conventional mount provides a side bracket adapted to hold the scope and is attached by dovetailed mating pieces to a base plate fixedly secured to the left of the receiver of the rifle. This form of mount is generally clamped to the base by cam levers or removable screws. Another form of mount has an elongated base or bar secured to the top of the receiver and provides brackets holding the scope and dovetailing into the base.

Although such mounts have met with some success, several drawbacks, briefly discussed here, have prevented the most efficient use of the scope mounted thereby. Notably, the cost of most mounts, presently known, which have any degree of accuracy, is generally as much as the scope itself. Their design has unduly weighted and complicated the rifle and for the most part, does not permit the ordinary riflemen to attach and detach completely the mount from the rifle without the aid of an experienced gunsmith or the manufacturer. Further, several conventional mounts are constructed so that quick removal of the scope and bracket from its base attachment and accurate speedy replacement in perfect adjustment is impossible.

It is desirable that mount permits the use of conventional iron sights when the scope is not needed. Many conventional mounts such as those utilizing elongated base blocks attached on top of the receiver do not leave room for the bead sights which must be removed for scope mounting.

Accordingly, an object of this invention is to provide improvements in mounts for telescopic gunsights.

Another object is to simplify and economize the construction of a telescopic gunsight mount without impairing the adaptability, durability or accuracy thereof.

Another object is to provide a mount for a telescopic gunsight which enables low mounting of the scope.

Another object is to provide a mount for telescopic gunsights which may be quickly attached to and detached from a rifle, even by inexperienced riflemen without changing adjustments previously made.

Another object is to provide a telescopic gunsight mount providing base members adapted to be secured to a rifle and bracket members for holding a scope, the brackets being adapted for simple and quick attachment to and detachment from the base members without interfering with the optical adjustment of the scope relative to the rifle.

Another object is to provide a mount for telescopic gunsights which permit the alternate utilization of conventional iron sights.

Another object is to provide a mounting device as set forth in the preceding paragraphs which is more durable and which holds its adjustment better under repeated recoil or inadvertent brushing against clothing, gun case, and the like, or incident to unauthorized tampering.

Other objects are to provide a mount for telescope sights which is adaptable for use on a variety of rifles, shotguns and the like, and with a variety of scopes, which is simple, economical, light in weight, durable, adjustable and highly effective for its intended function.

These and other objects will become more fully apparent upon reference to the following description.

Figure 1:
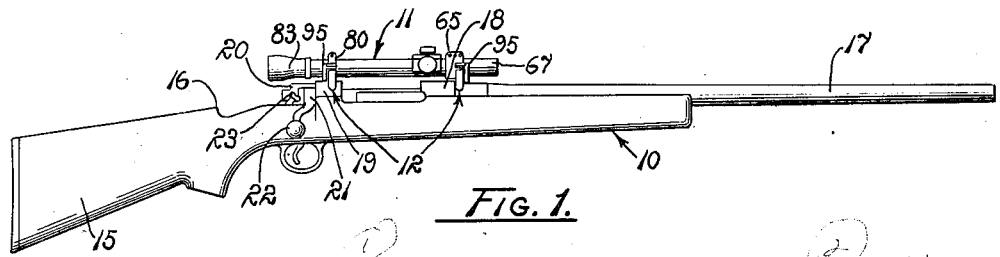
Fig. 1 is a side elevation of a rifle having a telescope sight and incorporating the mounting device of the present invention.
Figure 2:
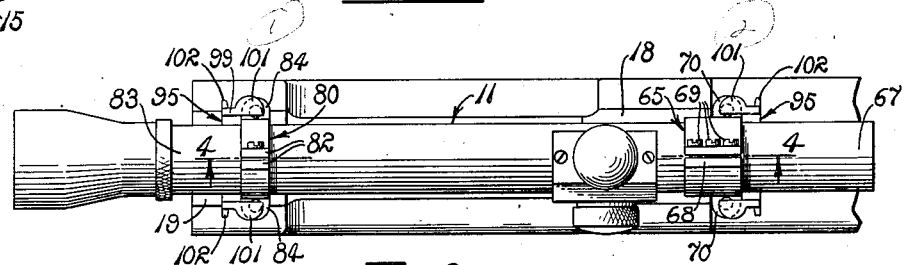
Fig. 2 is a somewhat enlarged fragmentary top view of the telescope sight of Fig. 1 shown in its attached position on the rifle.

Referring more particularly to the drawings:

In Fig. 1 is shown a rifle 10 having a telescope sight 11 attached thereto by the mounting device 12 of the present invention.

The rifle 10 may be any of a variety of conventional types and generally includes a butt stock 15 providing a comb 16 and a barrel 17. Rearwardly on the barrel is provided a receiver ring 18 and a receiver bridge 19. A bolt sleeve 20 extends rearwardly of the receiver bridge and a bolt 21 having a bolt handle 22 thereon is slidably received in the bolt sleeve and receiver bridge. A safety lock 23 is also shown on the rifle. This construction of rifle is conventional and is only described herein for convenience in later reference.

The barrel 17 is provided with a bore 29 having a longitudinally extending axis and with a central bore 30 adjacent to receiver ring 18 having an axis upwardly extending at substantially right angles to the axis of the barrel. A pair of lateral bores 31 are also provided in the barrel at each side of the central bore 30 having their axes respectively inclined outwardly from the axis of the central bore and preferably lying in substantially the same transverse plane as the axis of the central bore. The receiver bridge 19 is provided with a pair of lateral bores 32 likewise having their axes outwardly inclined from a vertical plane coincident with the axis of the barrel. The receiver bridge is also provided with an iron sight mounting bore 33 somewhat forwardly displaced from the plane of the lateral bores 32.

The mounting device 12 of the present invention includes a forward base member 35 having an inner arcuate surface 36 adapted to conform to the contour of the barrel 17 of the rifle. It will be readily apparent that the inner surface 36 could assume a variety of shapes depending upon the type of rifle utilized. The outer surface of the forward base member provides a pair of lateral surfaces 37 each having an opening 38 therethrough. Further, this outer surface includes a central portion 39 likewise providing an opening 40 therein. The forward base member has a forward edge 41 in which is provided a latch recess 42 forwardly adjacent to the opening 40 in the central portion 39. The forward base member also has a rearward edge 43.

The forward base member 35 is mounted on the rifle with the inner arcuate surface 36 fitted against the barrel 17 and with the rearward edge 43 thereof placed against the receiver ring 18. The openings 38 and 40 are aligned respectively with the lateral bores 31 and central bore 30 in the barrel. A central bolt 45 is threadably received in the aligned openings 40 and 30 and a pair of lateral bolts 46 are likewise threadably received in the aligned openings 38 and 31. The central bolt fits flush with the outer surface of the central portion 39 while the lateral bolts 46 are provided with the laterally extended heads 47 hereinafter referred to as heads, male members or pins. In this manner, the forward base member is fixedly secured to the barrel and may be detached by removal of the bolts 45 and 46 or attached by insertion of such bolts. The adjustment is simple and the base member is adapted to fit in precise position on the barrel each time it is positioned in the above described manner.

Figure 4:
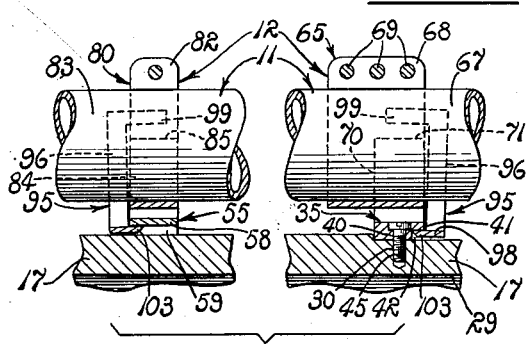
Fig. 4 is a somewhat enlarged fragmentary side elevation with parts being broken away to show the manner in which the scope is mounted on the rifle.
Figure 5:
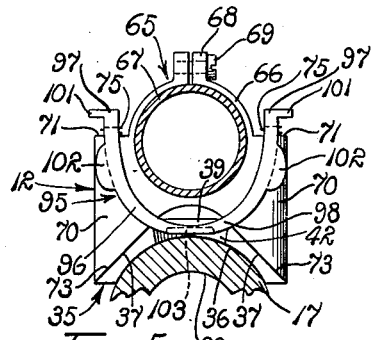
Fig. 5 is a fragmentary cross section taken along line 5—5 of Fig. 3.
Figure 6:
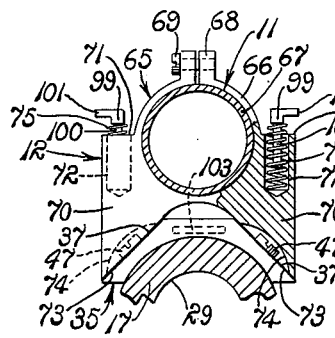
Fig. 6 is a fragmentary cross section taken along line 6—6 of Fig. 3.
Figure 7:
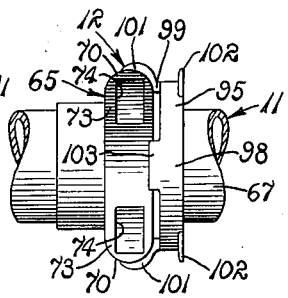
Fig. 7 is a bottom view of the forward mounting bracket and scope detached from the rifle.
Figure 8:
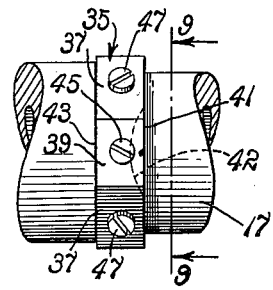
Fig. 8 is a top view of a portion of the rifle with the forward base member of the mounting device attached thereto and with the scope and forward mounting bracket detached from the rifle.
Figure 10:
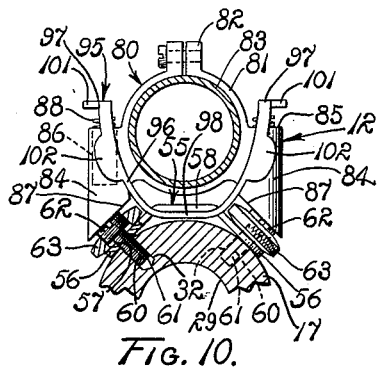
Fig. 10 is a cross section taken along line 10—10 of Fig. 3.
Figure 11:
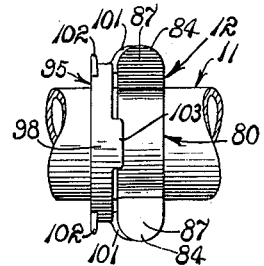
Fig. 11 is a bottom view similar to Fig. 7 of the rearward portion of the telescope and mounting bracket as shown in Fig. 10 but detached from the rifle.
Figure 9:
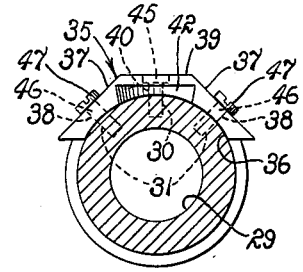
Fig. 9 is a cross section taken along line 9—9 of Fig. 8.
Figure 12:
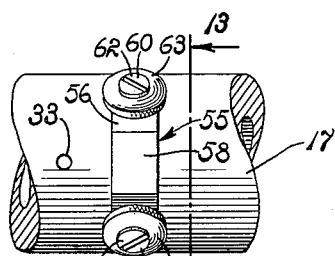
Fig. 12 is a view similar to Fig. 8 but showing the rearward base member of the mounting device.
Figure 13:
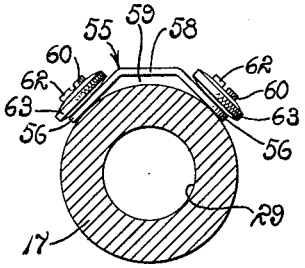
Fig. 13 is a transverse cross section taken along lines 13—13 of Fig. 12.

The mounting device 12 further provides a rearward base member 55 having a pair of lateral sections 56 each including an opening 57. The rearward base member also has a central section 58. The rearward base member is positioned on the rifle with the lateral sections seated on the receiver bridge 19 and with the openings 57 therein aligned with the lateral bores 32 in the bridge. The rearward base member is constructed in such a manner that when the lateral sections are properly positioned on the bridge with openings 57 aligned with bores 32, the central section 58 lies in vertical spaced relation, indicated at 59 in Fig. 4, from the receiver bridge. A pair of lateral bolts 60 having threaded mounting ends 61 and threaded heads 62 are fitted through the openings 57 and threadably received in the bores 32 of the bridge. The threaded heads 62 extend outwardly and a pair of knurled lock nuts 63 are threadably received on the heads. Obviously, heads 62 may comprise pins adjustable in the openings and bores, if desired.

The mounting device 12 also has a forward mounting bracket 65 providing an annular band 66 adapted to receive the forward end 67 of a telescope sight therein. The annular band has a clamping portion 68 through which bolts 69 are extended for contracting and loosening the band around the sight. The forward mounting bracket includes a body providing a pair of legs 70 mounted on opposite sides of the band. Each of the legs has a shoulder 71 and a bore 72 opening upwardly through the shoulder. Each leg further includes a lower inwardly inclined surface 73 providing a female recess 74 therein. A coil spring 75 is mounted within each of the bores 72 and extends upwardly therefrom to a position somewhat above shoulder 71.

A rearward mounting bracket 80 constituting another portion of the mounting device 12 is constructed in much the same manner as the forward mounting bracket 65. Thus, it includes an annular band 81 having a clamp 82 adapted to receive and retain the rearward end 83 of the telescope sight therein. Further, the rearward mounting bracket has a body including legs 84 providing shoulders 85 in which are provided bores 86. Each leg has a lower inwardly inclined surface 87. Contrary to the inwardly inclined surfaces 73 of the forward mounting bracket, the surface 87 is smooth. A pair of coil springs 88 are mounted within the bores 86 extending outwardly therefrom.

Each of the mounting brackets 65 and 70 are provided with a lock member indicated generally at 95. Because the lock members are identical in construction only the one associated with the forward mounting bracket is described in detail. Thus, the lock member includes a U-shaped portion 96 providing a pair of ends 97 and a central section 98. A flange 99 extends outwardly from each end 97 and a pin 100 is mounted on each of the flanges extending toward the central section 98 in a plane substantially parallel to the U-shaped portion. A finger tab 101 extends laterally of each flange 99 and a finger tab 102 extends laterally from each side of the central section 98. The central section is provided with a latch finger or tab 103 extended outwardly therefrom in a plane substantially parallel to the plane of the flanges 99 and in the same direction from the U-shaped portion. Each lock 85 is associated with its mounting bracket 65 and 70 by inserting the pins 100 in the upwardly extended coil springs 75 and 88 with the U-shaped portion 96 opening upwardly and the central section 98 thereof intermediate the legs 70 and 84 adjacent to the inclined surfaces 73 and 87, respectively.

Figure 3:
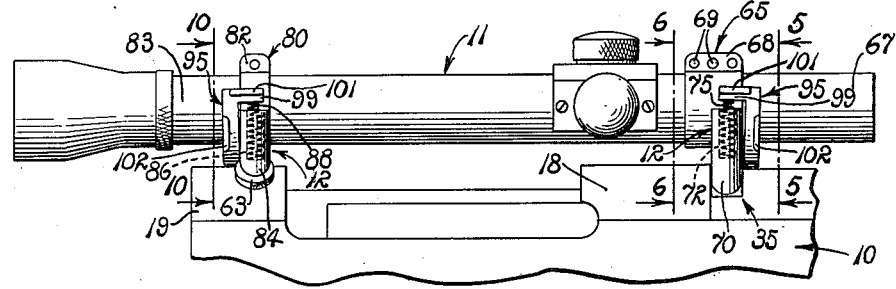
Fig. 3 is a fragmentary side elevation showing a portion of a rifle and the telescope sight as shown in Fig. 2.

The mounting brackets 65 and 80, including their lock members 85, are connected to the telescope sight 11 by loosening the clamps 68 and 82 and slidably fitting the telescope within the annular bands 66 and 81. In this regard it will be noted, from Fig. 3 especially, that the lock members are on relatively opposite sides of their mounting brackets in facing relation and that the scope is partially encompassed by the U-shaped portions 96. After the clamps have been tightened, the telescope sight and mounting brackets are ready to be fitted on the rifle. The female recesses 74 of the forward mounting bracket are received over the male members 47 of the forward base member 35 and the smooth surfaces 87 of the legs 70 of the rearward mounting bracket are rested against the outwardly extended heads 62 of the rearward base member 55. The U-shaped portion 96 of the forward lock member 95 is depressed by finger engagement with tabs 101 and 102 and the latch 103 is pressed into the recess 42 in the forward base member. Next, the rearward lock member 95 is similarly depressed and the latch 103 thereon is received in the space 59 defined between the central section 58 of the rearward base member and the receiver bridge 19. In this manner the telescope sight is fixedly secured to the rifle.

*Operation*

The operation of this invention is believed to be readily apparent and is briefly summarized at this point. The telescope mount 12 is best adapted for use on bolt-action rifles inasmuch as such rifles are easily adapted to accommodate the mount as provided for in the present invention.

Accordingly, it is first necessary to provide bores 29, 30 in the barrel adjacent to the receiver ring 18 and bores 32 in the receiver bridge 19. The forward and rearward base members 35 and 55 are then secured rigidly in place by means of central bolts 45, lateral bolts 46 and lateral bolts 60. These base members may be removed and replaced by even the most inexperienced riflemen and yet maintain their precise adjusted position on the rifle, although subject to precision adjustment, merely by manipulation of their respective bolts.

The scope 11 is prepared for mounting on the rifle by first attaching it to the forward and rearward mounting brackets 65 and 80. For this purpose, the annular bands 66, 81 of each bracket are expanded sufficiently to permit slidable insertion of the scope therein and the clamps 68, 82 of such bands are then tightened around the scope. Of course, prior to fitting the scope in the brackets, each of the brackets is provided with a lock member 95.

The scope 11 is then placed on the rifle 10 with the forward mounting bracket 65 positioned on the forward base member 35 with the female recesses 74 fitted over the extended heads 47. The rearward mounting bracket 80 is positioned on the rearward base member 55 with the flat smooth surfaces 87 of the former rested against the adjustable heads 62 of the latter. At this point, it is sometimes necessary to loosen the annular bands 66 or 81 in order to space the mounting brackets a distance on the scope corresponding to the distance between the base members on the rifle, as will be evident.

After the scope 11 has been preliminarily placed in proper position, as above described, on the base members 35, 55, the lock nuts 63 are loosened and the adjustable heads 62 inserted or extended to provide for windage and elevational adjustments for the scope. In this regard, it will be apparent that inserting or extending both of the heads an equal amount will lower or raise the rear end of the scope slightly relative to the forward end, thus effecting elevational adjustment. Inserting or extending one of the heads to a greater or lesser degree than the other head will shift the axis of the scope slightly relative to the barrel axis, thus enabling windage adjustment. When the scope is properly orientated, the lock nuts 63 are tightened down so as to maintain the heads in this predetermined position.

The scope 11 is then secured to the rifle 10 by pressing downwardly, preferably with the thumbs, on the tabs 101 of the lock member 95 associated with the forward mounting bracket 65 and at the same time pressing rearwardly with the forefingers on tabs 102 associated with the same lock member. This action urges the latch finger 103 into the latch recess 42 in the forward edge of the forward base member 35. When the finger pressure is released, the springs 75 urge the flanges 99 upwardly and thus press the latch 103 into the recess 42 in dependable manner.

The rear lock member 95 is similarly secured to the rear base member 55 by applying downward pressure with the thumbs on the tabs 101 and by simultaneously pressing forwardly on the tabs 102 thereby engaging the latch 103 under the central section 58 and within the space 59 between the rearward base member 55 and the receiver bridge 19. When finger pressure is relieved, the springs 88 urge the flanges of the rear lock upwardly to hold the latch 103 against the central section 58.

In this manner, the scope is held in fixed position in accordance with a predetermined adjustment on the rifle. The mount holds the scope dependably in such fixed position even incident to jarring, recoil, inadvertent contact therewith, during intentional adjustment of the reticules of the scopes, and the like. When it is desired to remove the scope from the rifle, it is merely necessary to press down on the finger tabs 101 and outwardly on the tabs 102 of both the forward and rearward lock members 95 in a manner believed to be apparent. The scope may then be lifted from the rifle with comparative ease. Again, if it is desired to replace the scope on the rifle, the user need only proceed in the manner described and the scope will be fixed in the same predetermined position in which it was previously placed.

It should be noted that the mounting device enables mounting of the scope at a very low position on the rifle. To permit such a low mount, the adjustable hands enable longitudinal adjustment of the scope to avoid contact with the bolt handle 22 when operated.

It is worthy of note that a rifleman may equip several rifles with the rearward and forward base member 55, 35 and need only possess one scope equipped with rearward and forward brackets 65, 80 and lock members 95. Each rifle may thus be individually adjusted in accordance with its own requirements by adjusting the heads 62 on the rear base member associated therewith. Since the mounting brackets need no adjustment and adapt themselves to the base members, a single telescope may be quickly applied to several different rifles. Since the base members represent the least expensive elements of the mount, this provides a highly economical arrangement without any reduction in accuracy or adjustability. Further, when the scope is removed from the rifle in the manner above described, an iron sight is easily substituted therefor. Though such a sight is not shown, it may be positioned on the receiver bridge 19 being connected to the rifle by means of the iron-sight mounting bore 33. In order to permit the use of such a sight, the rearward base member 55 is removed. This does not effect the use of the mounting device of the present invention inasmuch as the rearward base member is simply removed by loosening and removing the bolts 60.

It will be apparent from the foregoing that a highly effective mounting device has been provided for connecting telescopic sight to a rifle. The mounting device of this invention is economical to manufacture and therefore is relatively low in cost. Further, its simplicity and few number of parts enables it to be light in weight and therefore does not unnecessarily burden the rifle. Significantly, the mounting device offers simplicity, adjustability, versatility and accuracy and is excellently suited to the purpose, as above described.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An instrument mounting device comprising a pair of base members adapted to be fixedly secured in spaced relation on a support member having latch recesses, one of the base members providing outwardly extended rigid pins, the other base member having individually adjustable pins outwardly extended therefrom, a pair of mounting brackets adapted to hold an instrument therebetween, one of the mounting brackets having recesses mounting surfaces individually releasably fitted on the rigid pins of said one base member, the other mounting bracket having flat mounting surfaces bearing against the adjustable pins on the other base member, and locking members individually connected to the mounting brackets and engaging the base members associated with their respective brackets in the latch recesses thereof releasably to interconnect the brackets and base members.

2. An instrument mounting device comprising a pair of base members adapted to be fixedly secured in spaced relation on a support member, one of the base members providing outwardly extended rigid pins, the other base member providing outwardly extended pins adjustable in and out of the base member, a pair of mounting brackets each providing adjustable bands adapted to hold an elongated instrument therebetween and legs extended on opposite sides of the band associated therewith, the legs of one of the mounting brackets having recessed mounting surfaces individually releasably fitted on the rigid pins of said one base member, the legs of the other mounting bracket having smooth mounting surfaces bearing against the adjustable pins of the other base member, lock means releasably connected between the legs of each bracket and the base member associated therewith, and spring means mounted on each leg yieldably urging the lock means against the base members.

3. An instrument mounting device comprising a pair of base members adapted to be fixedly secured in spaced relation on a support member having portions thereof spaced from the support member, one of the base members providing outwardly extended rigid pins, the other base member having individually adjustable pins outwardly extended therefrom, a pair of mounting brackets individual to the base members each providing adjustable bands adapted to hold an elongated instrument therebetween and legs extended on opposite sides of the band associated therewith, adapted to support the instrument on their respective base members, the legs of one of the mounting brackets having recessed mounting surfaces fitted over the rigid pins on its respective base member, the legs of the other bracket bearing against the adjustable pins on its respective base member lock means releasably connected between the legs of each bracket and the base member associated therewith, and spring means mounted on each leg yieldably urging the lock means against the base members.

4. A mount for attaching a gunsight to a rifle, the gunsight having a sighting axis and the rifle having a barrel axis and the rifle being adapted to be held in use in a predetermined elevational plane containing the barrel axis, comprising forward and rearward base members mounted in fixed spaced relation on the rifle, forward and rearward mounting brackets fitted respectively on the forward and rearward base members and including means for mounting a gunsight therebetween, the forward bracket and the forward base member having interengaging male and female members restricting relative movement therebetween longitudinally of the rifle, and the rearward bracket and rearward base member having a pair of laterally spaced adjustable screws therebetween radially extended relative to the barrel axis of the rifle in substantially equal acute angular relation to said predetermined elevational plane for adjusting the lateral and elevational position of the gunsight axis relative to the barrel axis of the rifle.

5. In a rifle having a barrel with a longitudinal bore, a receiver ring and a receiver bridge, a mount for a telescopic gunsight comprising a forward base member, means releasably mounting the base member on the barrel adjacent to the receiver ring, the forward base member having a latch recess therein and having a pair of positioning heads outwardly extended therefrom; a rearward base member, means mounting the rearward base member on the receiver bridge, means on the rearward base member for holding a latch thereagainst, adjustable pins extended outwardly from the rearward base member, forward and rearward mounting brackets each providing an annular band adapted to receive the forward and rearward ends of a telescope respectively securely therein and a pair of shoulders at opposite sides of their respective bands having lower inwardly inclined mounting surfaces, the inclined mounting surfaces of the forward bracket providing recesses, and the rearward bracket having smooth flat inwardly inclined mounting surfaces, resilient means upwardly extended from each of the shoulders, and a pair of lock members each having a pair of ends integrally connected to an intermediate section, the ends of each lock member being connected individually to opposite resilient means on each bracket and having a latch extended from the intermediate section of each lock member, the forward mounting bracket being attached to the forward base member with the recesses in the former being fitted over the outwardly extended heads of the latter and with the latch of the lock member of the former being releasably pressed in the latch recess of the latter, and the rearward mounting bracket being attached to the rearward base member with the smooth flat mounting surfaces on the former bearing against the outwardly extended adjustable pins of the latter and with the latch of the lock member of the former being releasably held in the latch holding means of the latter.

6. In a rifle having a barrel with a longitudinal bore, a receiver ring and a receiver bridge; a mount for a telescopic gunsight comprising a forward base member of arcuate shape having a rearward edge; means releasably mounting the base fixedly on the barrel with the rearward edge fitted against the receiver ring, the forward base member having a latch recess therein and having a pair of positioning heads outwardly extended therefrom; a rearward base member of arcuate shape; means mounting the rearward base member on the receiver bridge; means on the rearward base member for holding a latch thereagainst; adjustable pins extended outwardly from the rearward base member; forward and rearward mounting brackets each providing an annular contractible band adapted to receive the forward and rearward ends of a telescope respectively securely therein and a pair of legs connected at opposite sides of the respective band, each of the legs having a shoulder and having a bore opening outwardly through the shoulder, the legs of the forward bracket having lower inwardly inclined mounting surfaces providing recesses and the legs of the rearward bracket having smooth flat inwardly inclined mounting surfaces; coil springs individually mounted in the bores of the legs and upwardly extended from the shoulders thereon; and a pair of substantially U-shaped lock members each having a pair of ends and an intermediate section, a flange extended outwardly in substantially perpendicular relation from each of the ends, pins substantially perpendicularly extended from the flanges toward the intermediate section being loosely received within the coil springs associated respectively with the forward and rearward mounting brackets, and a projecting latch extended from the intermediate section in the same direction from the lock member as the flanges, the forward mounting bracket being attached to the forward base member with the recesses in the legs of the former being fitted over the outwardly extended heads of the latter and with the projecting latch of the lock member in the former being releasably pressed in the latch recess of the latter, and the rearward mounting bracket being attached to the rearward base member with the smooth flat mounting surfaces on the legs of the former bearing against the outwardly extended adjustable pins of the latter and with the projecting latch of the lock member of the former being releasably held in the latch holding means of the latter.

7. In a rifle having a barrel with a longitudinal bore, a receiver ring and a receiver bridge, the barrel providing a central bore and a pair of lateral bores adjacent to the receiver ring having axes disposed at right angles to the axis of the barrel, the receiver bridge also providing a pair of lateral bores having axes disposed at right angles to the barrel axis; a mount for telescopic gunsights comprising a forward base member of arcuate shape having a forward edge, a rearward edge, and providing a central opening and a pair of lateral openings, the base being fixedly mounted on the barrel with the rearward edge fitted against the receiver ring and with its openings respectively aligned with the central and lateral bores in the barrel, the forward edge providing a recess forwardly of the central opening, bolts screwthreadably received in the openings and bores of the forward base member and the barrel, the bolts in the lateral openings and bores having heads outwardly extended; a rearward base member of arcuate shape having a central portion and a pair of lateral portions each providing an opening therein, the rearward base member being mounted on the receiver bridge with its openings aligned with the lateral bores in the bridge and with the central portion vertically spaced therefrom; adjusting bolts having threaded mounting ends received in the aligned openings and bores of the rearward base member and the receiver bridge and having outwardly extended threaded heads; lock nuts threadably received on the threaded heads; a forward mounting bracket providing an annular contractible band adapted to receive the forward end of a telescope securely therein and a pair of legs connected at opposite sides of the band, each of the legs having a shoulder providing a bore and a lower inwardly inclined mounting surface providing a recess, coil springs individually mounted in the bores of the legs and upwardly extended from the shoulders thereon; a substantially U-shaped forward lock member having a pair of ends and an intermediate section and providing a flange extended outwardly in substantially perpendicular relation from each of the ends, pins substantially perpendicularly extended from the flanges toward the intermediate section being loosely received within said coil springs, in the forward mounting bracket and a projecting catch extended from the intermediate section in the same direction from the lock member as the flanges; a rearward mounting bracket providing an annular contractible band adapted to receive the rearward end of a telescope securely therein and a pair of legs connected at opposite sides of the band, each of the legs having a shoulder providing a bore and a lower inwardly inclined smooth flat mounting surface, coil springs individually mounted in the bore of the legs and upwardly extended from the shoulder thereon; and a substantially U-shaped rearward lock member having a pair of ends and an intermediate section and providing a flange outwardly extended in substantially perpendicular relation from each of the ends, pins substantially perpendicularly extended from the flanges toward the intermediate section being fitted within the coil springs of the rearward mounting bracket, and a projecting catch extended from the intermediate section in the same direction from the lock member as the flanges, the forward mounting bracket being attached to the forward base member with the recesses in the legs of the former being fitted over the outwardly extended heads of the bolts in the latter and with the projecting catch of the lock member in the former being releasably pressed in the recess in the forward edge of the latter, and the rearward mounting bracket being attached to the rearward base member with the smooth mounting surfaces on the legs of the former bearing against the outwardly extended heads of the adjusting bolts of the latter and with the projecting catch of the lock member of the former being releasably pressed under the central portion of the latter.

8. A device for mounting an elongated instrument on an elongated substantially cylindrical support member having a longitudinal axis comprising forward and rearward base members secured to the support member in spaced relation longitudinally of the support member, the forward base member providing a fixed outwardly extended forward male member, the rearward base member providing a pair of angularly spaced rearward adjusting members extended outwardly of the rearward base member in radial relation to the support member and in acute angular relation to a diametrical plane containing the longitudinal axis of the support member and lying intermediate the adjusting members, the adjusting members being adjustable inwardly and outwardly of the rearward base member, a forward mounting bracket having a female mounting recess fitted over the forward male member of the forward base member, a rearward mounting bracket having mounting surfaces angularly related to each other positioned against the adjusting members, and means individually releasably interconnecting the mounting brackets and their respective base members.

9. An instrument mounting device comprising a pair of base members adapted to be fixedly secured in spaced relation on a support member having central portions spaced from the support member, one of the base members providing outwardly extended rigid pins on opposite sides of the central portion thereof, a pair of mounting brackets individually upwardly extended from the base members having body portions including adjustable bands adapted to hold an elongated instrument therebetween, the body portion of one of the mounting brackets having mounting recesses fitted over the rigid pins of its respective base member, the body portion of the other bracket having a mounting surface rested against its respective base member, compression springs upwardly extended from the body portions of the brackets on opposite sides of the bands, and lock members individually associated with the brackets having upper end portions mounted in and adapted to bear downwardly on the springs in the body portions of their respective brackets and lower end portions releasably fitted under the central portions of the base members on which their associated brackets are mounted.

10. A mount for attaching a gunsight to a rifle having a barrel axis comprising forward and rearward base members mounted in fixed longitudinally spaced relation on the rifle and having central latch-receiving portions spaced from the rifle, laterally spaced radially extended forward rigid male members mounted on the forward base member, a pair of laterally spaced adjustable screws outwardly extended from the rearward base member in radial relation to the barrel axis of the rifle in substantially equal acute angular relation to the barrel axis of the rifle in substantially equal acute angular relation to a plane containing the barrel axis and lying intermediate the screws, a forward gunsight mounting bracket having a mounting surface providing recesses fitted over the forward male members, a rearward gunsight mounting bracket having flat mounting surfaces angularly related to each other in substantially the same angular relation as that of the screws and being positioned against the screws, locking means individually associated with the mounting brackets including latch portions releasably fitted under the central portions of the base members associated with their respective brackets, and resilient means interconnecting the locking means and their associated brackets yieldably urging their respective latch portions against the base members.

11. In a rifle having a barrel with a longitudinal bore, a receiver ring and a receiver bridge, a mount for a telescopic gunsight comprising a forward base member releasably mounted on the barrel adjacent to the receiver ring having a latch recess and a pair of outwardly extended positioning heads; a rearward base member mounted on the receiver bridge having a latch holding portion and adjustable pins outwardly extended in radial relation to the barrel and in substantially right-angular relation to each other; a forward mounting bracket having a central annular band and a pair of shoulders at opposite sides of the band providing lower inclined recessed mounting surfaces fitted over the positioning heads of the forward base member; a rearward mounting bracket having a central annular band and a pair of shoulders at opposite sides of the band providing lower inclined mounting surfaces engaging the adjustable pins, the forward and rearward brackets being adapted to support a telescopic gunsight in the bands thereof; resilient means mounted in and upwardly extended from the shoulders; and a pair of lock members having end portions interconnected by central portions, latches extended from the central portions being individually associated with the forward and rearward brackets and base members, the end portions of the lock members being mounted in the resilient means on their respective brackets, the central portions extended toward the barrel, and the latches being releasably resiliently fitted respectively in the latch recess of the forward base member and in the latch holding member of the rearward base member.

References Cited in the file of this patent

UNITED STATES PATENTS

| | | |
|---|---|---|
| 1,613,807 | Rutherford | Jan. 11, 1927 |
| 2,493,254 | Leupold | Jan. 3, 1950 |
| 2,496,045 | Ford | Jan. 31, 1950 |
| 2,649,779 | Hardgrove | Aug. 25, 1953 |
| 2,659,150 | Feerick | Nov. 17, 1953 |

FOREIGN PATENTS

| | | |
|---|---|---|
| 339,083 | Germany | July 15, 1921 |